United States Patent
Mukherjee et al.

(10) Patent No.: US 12,014,030 B2
(45) Date of Patent: Jun. 18, 2024

(54) SYSTEM FOR PREDICTIVE VIRTUAL SCENARIO PRESENTATION

(71) Applicant: Bank of America Corporation, Charlotte, NC (US)

(72) Inventors: Maharaj Mukherjee, Poughkeepsie, NY (US); Jinna Zevulun Kim, Charlotte, NC (US); Kyle A. Mayers, Charlotte, NC (US); George Anthony Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 160 days.

(21) Appl. No.: 17/405,624

(22) Filed: Aug. 18, 2021

(65) Prior Publication Data

US 2023/0057371 A1   Feb. 23, 2023

(51) Int. Cl.
*G06F 3/0484* (2022.01)
*G06F 3/01* (2006.01)
*G06F 9/451* (2018.01)
*G06N 5/04* (2023.01)

(52) U.S. Cl.
CPC .......... *G06F 3/0484* (2013.01); *G06F 3/011* (2013.01); *G06F 9/451* (2018.02); *G06N 5/04* (2013.01)

(58) Field of Classification Search
CPC ........ G06F 3/0484; G06F 3/011; G06F 9/451; G06F 3/04815; G06N 5/04; H04M 1/72454
USPC ..... 345/633, 952; 715/757, 848, 706; 703/6, 703/8, 2; 705/14.58, 14.66, 7.29
See application file for complete search history.

(56) References Cited

U.S. PATENT DOCUMENTS

| | | | |
|---|---|---|---|
| 7,099,850 B1 | 8/2006 | Mann et al. | |
| 8,429,103 B1 * | 4/2013 | Aradhye | H04M 1/72448 706/12 |
| 9,153,074 B2 | 10/2015 | Zhou et al. | |
| 9,704,154 B2 | 7/2017 | Xing et al. | |
| 10,134,084 B1 | 11/2018 | Gabriele et al. | |
| 10,529,028 B1 * | 1/2020 | Davis | G06Q 40/08 |
| 10,579,749 B1 * | 3/2020 | Davis | G06F 30/20 |
| 10,796,290 B2 | 10/2020 | Jacobs et al. | |
| 10,885,701 B1 * | 1/2021 | Patel | A63F 13/57 |

(Continued)

OTHER PUBLICATIONS

Stock et al. Realistic Simulation of Progressive Vision Diseases in Virtual Reality. VRST '18, Nov. 28-Dec. 1, 2018, Tokyo, Japan. ACM ISBN 978-1-4503-6086-9/18/11. https://doi.org/10.1145/3281505.3283395. 2 pages (Year: 2018).*

(Continued)

*Primary Examiner* — Tan H Tran (57) ABSTRACT

A scenario presentation device presents, in an electronic display, selectable for possible activities. The device receives a selection of a first scenario option. The selected first scenario option corresponds to a selected activity that includes an action involving an item to be performed over a period of time. The device determines anticipated changes to the environment over the period of time. Using the anticipated changes to the environment over the period of time, a projected environment representation is determined for the selected activity. The projected environment representation includes one or more images depicting changes to the environment. The projected environment representation is presented in the electronic display.

20 Claims, 6 Drawing Sheets

(56) References Cited

U.S. PATENT DOCUMENTS

| | | | |
|---|---|---|---|
| D916,860 S | 4/2021 | Tedesco et al. | |
| 10,970,546 B2 | 4/2021 | Yakishyn et al. | |
| 10,976,982 B2 | 4/2021 | Rochford et al. | |
| 10,977,871 B2 | 4/2021 | Delia et al. | |
| 10,978,018 B2 | 4/2021 | Sharma | |
| 10,981,060 B1 | 4/2021 | Muskin | |
| 10,984,493 B1 | 4/2021 | Borchardt et al. | |
| 10,984,602 B1 | 4/2021 | Miranda et al. | |
| 10,987,573 B2 | 4/2021 | Nietfeld et al. | |
| 10,990,186 B2 | 4/2021 | Wan et al. | |
| 10,990,683 B2 | 4/2021 | Wang et al. | |
| 10,990,755 B2 | 4/2021 | Shanmugam et al. | |
| 10,990,756 B2 | 4/2021 | Shanmugam et al. | |
| 11,010,015 B2 | 5/2021 | Mccormack et al. | |
| 11,017,232 B2 | 5/2021 | Alexander | |
| 11,024,088 B2 | 6/2021 | Heinen et al. | |
| 11,058,945 B2 | 7/2021 | Humadi | |
| 11,068,969 B2 | 7/2021 | Wilson et al. | |
| 11,069,145 B1 | 7/2021 | Pearson et al. | |
| 11,071,912 B2 | 7/2021 | Silverstein et al. | |
| 11,074,432 B2 | 7/2021 | Doolani et al. | |
| 11,082,462 B2 | 8/2021 | Miller | |
| 11,082,535 B2 | 8/2021 | Fowe | |
| 11,083,967 B1 | 8/2021 | Summit | |
| 11,087,539 B2 | 8/2021 | Unnerstall et al. | |
| 11,087,555 B2 | 8/2021 | Miller et al. | |
| 11,087,559 B1 | 8/2021 | Kuhn et al. | |
| 11,087,562 B2 | 8/2021 | Croxford et al. | |
| 2006/0232605 A1* | 10/2006 | Imamura | G06Q 30/06 345/619 |
| 2011/0306387 A1* | 12/2011 | Moon | G06F 16/434 455/566 |
| 2012/0113223 A1 | 5/2012 | Hilliges et al. | |
| 2014/0257862 A1* | 9/2014 | Billman | G06Q 40/08 705/4 |
| 2016/0103433 A1* | 4/2016 | Sahni | G06F 3/0484 700/83 |
| 2016/0284125 A1* | 9/2016 | Bostick | G06F 3/012 |
| 2017/0053297 A1* | 2/2017 | Malaviya | G06Q 40/06 |
| 2018/0101985 A1* | 4/2018 | Jones-McFadden | G06V 20/20 |
| 2018/0107269 A1* | 4/2018 | Benzies | G06F 3/012 |
| 2018/0165977 A1* | 6/2018 | Johansen | G09B 5/02 |
| 2018/0350144 A1* | 12/2018 | Rathod | H04W 4/021 |
| 2019/0011700 A1* | 1/2019 | Reiner | G03H 1/0005 |
| 2019/0316309 A1* | 10/2019 | Wani | G06F 3/0484 |
| 2019/0384865 A1* | 12/2019 | Jaiswal | H04L 67/535 |
| 2019/0388787 A1* | 12/2019 | Padmanabhan | G09B 19/00 |
| 2021/0195640 A1 | 6/2021 | Nagarajan et al. | |
| 2021/0201585 A1 | 7/2021 | Park et al. | |
| 2021/0208398 A1 | 7/2021 | Shao et al. | |
| 2021/0209856 A1 | 7/2021 | Liukkonen et al. | |
| 2021/0215933 A1 | 7/2021 | Wieczorek | |
| 2021/0217201 A1 | 7/2021 | Hong et al. | |
| 2021/0217386 A1 | 7/2021 | Lal et al. | |
| 2021/0224910 A1 | 7/2021 | Romero | |
| 2021/0225064 A1 | 7/2021 | Ding et al. | |
| 2021/0225525 A1 | 7/2021 | Lund et al. | |
| 2021/0227203 A1 | 7/2021 | Zhou | |
| 2021/0240219 A1 | 8/2021 | Buckley | |
| 2021/0248821 A1 | 8/2021 | Wolfensparger et al. | |
| 2021/0249634 A1 | 8/2021 | Wang et al. | |
| 2021/0279852 A1* | 9/2021 | Jakka | G06F 18/2413 |
| 2022/0188545 A1* | 6/2022 | Nagar | G06F 3/017 |

OTHER PUBLICATIONS

Krosel et al. CatARact: Simulating Cataracts in Augmented Reality. 2020 IEEE International Symposium on Mixed and Augmented Reality (ISMAR) DOI 10.1109/ISMAR50242.2020.00098. pp. 682-693. (Year: 2020).*

Krosel et al. ICthroughVR: Illuminating Cataracts through Virtual Reality. 2019 IEEE Conference on Virtual Reality and 3D User Interfaces Mar. 23-27, Osaka, Japan. pp. 655-663 (Year: 2019).*

Yung et al. Around the world in less than a day: virtual reality, destination image and perceived destination choice risk in family tourism. Tourism Recreation Research, 46:1, 3-18, DOI: 10.1080/02508281.2020.1788351. Published online Jul. 14, 2020. 17 pages. (Year: 2020).*

Fan et al. Warrior Vehicle Fleet Sustainment using Intelligent Agent Simulation. 2nd International Through-life Engineering Services Conference. Procedia CIRP 11 ( 2013 ) 213-218. (Year: 2013).*

Hu et al. Outshine to Outbid: Weather-Induced Sentiments on Housing Market. Draft document dated Nov. 1, 2017. 41 pages. (Year: 2017).*

* cited by examiner

SYSTEM FOR PREDICTIVE VIRTUAL SCENARIO PRESENTATION

TECHNICAL FIELD

The present disclosure relates generally to technologies for presenting virtual scenarios. More particularly, in certain embodiments, the present disclosure is related to a system for predictive virtual scenario presentation.

BACKGROUND

Electronic display technology is rapidly developing to support the presentation of virtual environments. For example, augmented reality and virtual reality technology can present virtual environments.

SUMMARY

As described above, augmented reality and virtual reality technology is typically used to provide user amusement. The virtual environments presented by previous augmented reality and virtual reality have little or no additional usefulness to the user. This disclosure recognizes that the ability to efficiently visualize possible outcome scenarios of prospective activities would significantly improve the performance of systems used to provide virtual representations as well as the utility of information provided in these virtual representations. Previous technology fails to provide tools for such a purpose.

Certain embodiments of this disclosure may be integrated into the practical application of a virtual scenario presentation device that provides improvements to previous technology, including those identified above. The virtual scenario presentation device presents virtual representations of potential scenarios based on selectable activities. For example, the disclosed system and device provide several technical advantages over previous augmented reality and virtual reality technology, which include: (1) the generation and presentation of improved virtual presentations that include representations of possible outcomes that may result in response to certain activities; (2) the determination and presentation of resources consumed in response to certain activities, thereby facilitating more efficient resource consumption; and (3) the presentation of immersive visual representations showing how an activity may be perceived over time (e.g., as the environment changes, the item changes, etc.). Through these technical improvements, the disclosed system and device provide more accurate and more readily interpretable visual representations of possible outcomes of possible activities and thus provide an improvement to augmented reality and virtual reality technology. As an example, the virtual scenario presentation device may provide a more accurate and usable representation of resource consumption over time in response to a prospective activity, which may facilitate the more efficient use of resources. As such, this disclosure may improve the function of computer systems used for providing augmented reality and/or virtual reality presentations. In some embodiments, the virtual scenario presentation device transforms certain pieces of descriptive information (e.g., from repositories of activity data and/or user data) into immersive virtual presentations that accurately reflect the possible outcomes of certain activities.

In an embodiment, a system includes an activity data repository that stores activity data. The activity data includes one or more of item properties associated with items involved with possible activities, environment properties associated with environments in which the possible activities take place, and resource properties corresponding to resources consumed to engage in the possible activities. A scenario presentation device includes a network interface communicatively coupled to the activity data repository, an electronic display, and a processor operatively coupled to the network interface and the electronic display. The processor presents, in the electronic display, one or more selectable options corresponding to possible activities that can be performed and a representation of an environment associated with the possible activities. The processor receives a selection of a first scenario option. The selected first scenario option corresponds to a selected activity, which itself corresponds to an action involving an item to be performed over a period of time. The processor determines, using the selected activity and the environment properties of the activity data, anticipated changes to the environment over the period of time. The processor determines, using the anticipated changes to the environment over the period of time, a projected environment representation for the selected activity. The projected environment representation includes one or more images depicting changes to the environment over the period of time associated with the selected activity. The projected environment representation determined for the selected activity is presented in the electronic display.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
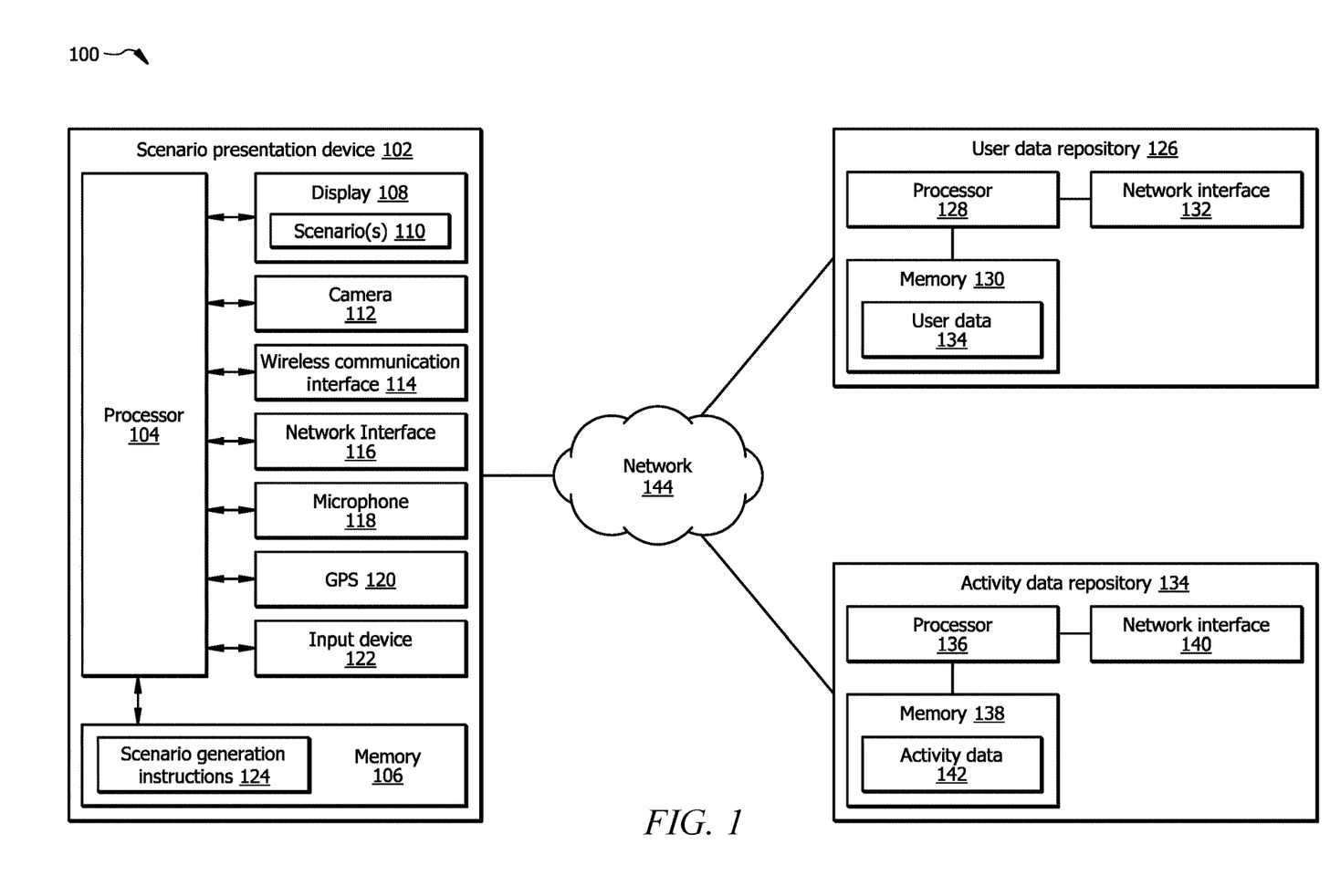
FIG. 1 is a diagram of system for providing scenario representations in a scenario presentation device.
Figure 2:
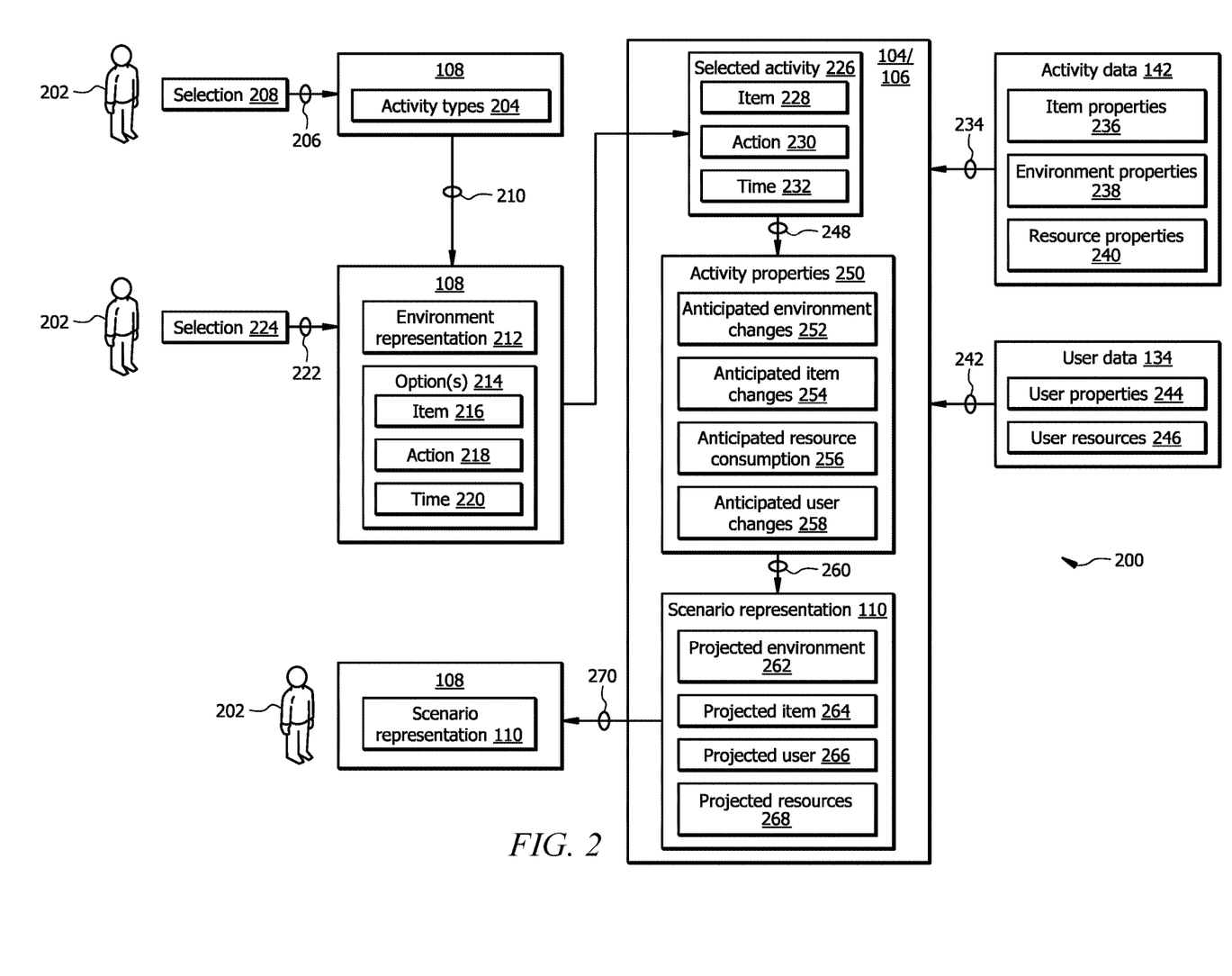
FIG. 2 is a flow diagram illustrating example operation of the scenario presentation device of FIG. 1.

This disclosure provides solutions to the aforementioned and other problems of previous technology by providing the practical application of a virtual scenario presentation device that determines improved information about possible outcomes to prospective activities. The scenario presentation device may provide users information that was not previously available in a format that is both user-friendly and readily interpretable (e.g., as one or more images or as immersive visual presentation). An example of a system in which the scenario presentation device may operate is shown in FIG. 1. An example method of operating the scenario presentation device is illustrated in FIG. 2. FIGS. 3A-C, 4, 5A-C, and 6A-C illustrate examples of scenario presentations that may be determined and presented by the scenario presentation device.

Example System for Query Processing of a Frequency of Utility Indicators

FIG. 1 illustrates an example system 100 for providing scenario representations 110 in a scenario presentation device 102. The system 100 includes the scenario presentation device 102, a user data repository 126, an activity data repository 134, and a network 144. The system 100 generally facilitates improved virtual scenario presentation through the generation and presentation of scenario representations 110, which provide a visual or audio-visual representation of a possible outcome if a user (e.g., user 202 of FIG. 2) were to engage in a certain activity. Examples of scenario representations 110 include augmented reality and/or virtual reality representations of a possible outcome of an activity, as illustrated in the examples of FIGS. 3A-C, 4, 5A-C, and 6A-C.

The scenario presentation device 102 is configured to determine a scenario representation for an activity selected by a user of the scenario presentation device 102. For instance, the scenario presentation device 102 may use a selected activity (see FIG. 2) and at least a portion of the activity data 142 obtained from the activity data repository 134 to determine anticipated changes to the user engaging in the activity, an item associated with the activity, the environment in which the activity takes place, or combinations of these. These anticipated changes are used to determine projected scenario representations 110 which include images of the projected appearance of the user, item, environment, etc. for the activity. The scenario representations 110 are presented in the display 108 of the scenario presentation device 102. An example operation of the scenario presentation device 102 is described in greater detail below with respect to FIG. 2, and example scenario representations 110 are illustrated in FIGS. 3A-C, 4, 5A-C, and 6A-C.

In some embodiments, the scenario presentation device 102 is a wearable device, such as a wearable virtual reality device, such that the scenario representations 110 are an immersive experience for the user of the scenario presentation device 102. In some embodiments, the scenario presentation device 102 is an augmented reality device (e.g., a wearable device, a smart phone, or the like). In such embodiments, the scenario presentation device 102 may overlay images determined as a scenario representation 110 on images captured by a camera 112 (e.g., such that the scenario representation 110 appears to be presented in the local environment of the scenario presentation device 102. In some embodiments, the scenario presentation device 102 is another device that provides for the presentation of the scenario presentation(s) 110 (e.g., as visual or audiovisual presentation(s)).

The scenario presentation device 102 includes at least a processor 104, a memory 106, and a display 108. Further embodiments may include a camera 112, a wireless communication interface 114, a network interface 116, a microphone 118, a global position system (GPS) sensor 120, and/or one or more input devices 122. The scenario presentation device 102 may be configured as shown or in any other suitable configuration. For example, the scenario presentation device 102 may include one or more additional components, and/or one or more shown components may be omitted.

The processor 104 includes one or more processors operably coupled to and in signal communication with memory 106, display 108, camera 112, wireless communication interface 114, network interface 116, microphone 118, GPS sensor 120, and input devices 122. Processor 104 is configured to receive and transmit electrical signals among one or more of memory 106, display 108, camera 112, wireless communication interface 114, network interface 116, microphone 118, GPS sensor 120, and input devices 122. The electrical signals are used to send and receive data (e.g., images captured from camera 112, scenario representations 110 to display on display 108, etc.) and/or to control or communicate with other devices.

The processor 104 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 104 may be a programmable logic device, a microcontroller, a microprocessor, or any suitable combination of the preceding. The one or more processors are configured to process data and may be implemented in hardware or software. For example, the processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, including the scenario generation instructions 124, described further below. For example, the one or more processors are configured to execute instructions to implement the function disclosed herein, such as some or all of those described with respect to FIG. 2 below. For example, processor 104 may be configured to detect user inputs/selections, determine scenario representations 110, cause display of scenario representations 110 on display 108, and communicate via wireless communication interface 114 with network 144 (e.g., to access the user data repository 126 and/or activity data repository 134).

The memory 106 is operable to store any of the information described with respect to FIGS. 1 and 2 along with any other data, instructions, logic, rules, or code operable to implement the function(s) described herein when executed by processor 104. For example, the memory 106 may store scenario generation instructions 124, which include the logic, rules, code, and/or rules to implement the operations described with respect to FIG. 2 below. The memory 106 includes one or more disks, tape drives, or solid-state drives, and may be used as an over-flow data storage device, to store programs when such programs are selected for execution, and to store instructions and data that are read during program execution. The memory 106 may be volatile or non-volatile and may comprise read-only memory (ROM), random-access memory (RAM), ternary content-addressable memory (TCAM), dynamic random-access memory (DRAM), and static random-access memory (SRAM).

Display 108 is configured to present visual information, such as scenario representations 110, images from camera 112, to a user (e.g., user 202 of FIG. 2). This visual information may be presented in a virtual reality environment (see, e.g., examples of FIGS. 5A-C and 6A-C) or an augmented reality environment that overlays virtual or graphical objects onto tangible objects in a real scene in near real-time. In an embodiment, display 108 is a wearable optical display (e.g., glasses or a headset). For example, display 108 may comprise display units, lens, semi-transparent mirrors, and/or the like embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 108 is a graphical display on a user device. For example, the graphical display may be the display of a tablet or smart phone.

Examples of camera 112 include, but are not limited to, charge-coupled device (CCD) cameras and complementary metal-oxide semiconductor (CMOS) cameras. Camera 112 is configured to capture images of an environment local to the scenario presentation device 102. Camera 112 may be configured to capture images continuously, at predetermined intervals, or on-demand. For example, camera 112 may be configured to receive a command to capture an image. In another example, camera 112 is configured to continuously capture images to form a video stream. Camera 112 is communicably coupled to processor 104.

Examples of wireless communication interface 114 include, but are not limited to, a Bluetooth interface, an RFID interface, an NFC interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. Wireless communication interface 114 is configured to facilitate processor 104 in communicating with other devices. For example, wireless communication interface 114 is configured to enable processor 104 to send and receive signals with other devices, such as a wireless input device 122. Wireless communication interface 114 is configured to employ any suitable communication protocol.

The network interface 116 is configured to enable wired and/or wireless communications. The network interface 116 is configured to communicate data between the scenario presentation device 102 and other network devices, systems, or domain(s), such as network 144. For example, the network interface 116 may comprise a WIFI interface, a local area network (LAN) interface, a wide area network (WAN) interface, a modem, a switch, or a router. The processor 104 is configured to send and receive data using the network interface 116. The network interface 116 may be configured to use any suitable type of communication protocol as would be appreciated by one of ordinary skill in the art.

Microphone 118 is configured to capture audio signals (e.g. voice signals or commands) from a user, such as first user 202 of FIG. 2. Microphone 118 is configured to capture audio signals continuously, at predetermined intervals, or on-demand. Microphone 118 is communicably coupled to processor 104.

GPS sensor 120 is configured to capture and to provide geographical location information. For example, GPS sensor 120 is configured to provide a geographic location of a user, such as user 202 of FIG. 2, employing scenario presentation device 102. GPS sensor 120 may be configured to provide the geographic location information as a relative geographic location or an absolute geographic location. GPS sensor 120 may provide the geographic location information using geographic coordinates (i.e., longitude and latitude) or any other suitable coordinate system. GPS sensor 120 is communicably coupled to processor 104.

Input device(s) 122 are configured to capture a user input for use by the scenario presentation device 102. For instance, a user input may be provided to indicate a selection of an activity for which a scenario representation 110 should be generated and presented (see FIG. 2). Input via an input device 122 may also facilitate viewing of the scenario representation 110 (e.g., to move about a virtual reality environment presented as a scenario representation 110 (see examples of FIGS. 5A-C and 6A-C)). Examples of input devices 122 include, but are not limited to, a computer mouse, a keyboard, a touchscreen, a controller with buttons and/or a joystick(s), and the like. In some cases, an input device 122 may provide a biometric information about a user. Such input devices 122 may be referred to as a biometric device, examples of which include retina scanners and fingerprint scanners. Input devices 122 are communicably coupled to processor 104.

Information about the user of the scenario presentation device 102 (e.g., user 202 of FIG. 2) may be stored as user data 134 in the user data repository 126 and accessed as necessary by the scenario presentation device 102. The example user data repository 126 of FIG. 1 includes a processor 128, memory 130, and network interface 132. The processor 128 of the user data repository 126 includes one or more processors. The processor 128 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 128 may be a programmable logic device, a microcontroller, a microprocessor, or any suitable combination of the preceding. The processor 128 is communicatively coupled to and in signal communication with the memory 130 and network interface 132. The one or more processors are configured to process data and may be implemented in hardware and/or software. For example, the processor 128 may be 8-bit, 16-bit, 32-bit, 64-bit or of any other suitable architecture. The processor 128 may include an arithmetic logic unit (ALU) for performing arithmetic and logic operations, processor registers that supply operands to the ALU and store the results of ALU operations, and a control unit that fetches instructions from memory 130 and executes them by directing the coordinated operations of the ALU, registers and other components. In an embodiment, the function of the user data repository 126 described herein is implemented using logic units, FPGAs, ASICs, DSPs, or any other suitable hardware or electronic circuitry.

The memory 130 of the user data repository 126 is operable to store any data, instructions, logic, rules, or code operable to execute the functions of the user data repository 126. The memory 130 may store the user data 134 as well as any other logic, code, rules, and the like to execute functions of the user data repository 126. As illustrated in FIG. 2 (described further below), the user data 134 may include properties of the user of scenario presentation device 102 and information regarding resources available to the user to engage in possible activities for which scenario representations 110 are to be generated. The memory 130 includes one or more disks, tape drives, or solid-state drives, and may be used as an over-flow data storage device, to store programs when such programs are selected for execution, and to store instructions and data that are read during program execution. The memory 130 may be volatile or non-volatile and may comprise read-only memory (ROM), random-access memory (RAM), ternary content-addressable memory (TCAM), dynamic random-access memory (DRAM), and static random-access memory (SRAM).

The network interface 132 of the user data repository 126 is configured to enable wired and/or wireless communications. The network interface 132 is configured to communicate data between the user data repository 126 and other network devices, systems, or domain(s), such as the network 144 and scenario presentation device 102. The network interface 132 is an electronic circuit that is configured to enable communications between devices. For example, the network interface 132 may include one or more serial ports (e.g., USB ports or the like) and/or parallel ports (e.g., any type of multi-pin port) for facilitating this communication. As a further example, the network interface 132 may include a WIFI interface, a local area network (LAN) interface, a wide area network (WAN) interface, a modem, a switch, or a router. The processor 128 is configured to send and receive data using the network interface 132. The network interface 132 may be configured to use any suitable type of communication protocol as would be appreciated by one of ordinary skill in the art. The network interface 132 communicates user data 134 to the scenario presentation device 102.

Information about possible activities for which scenario representations 110 may be determined may be stored as activity data 142 in the activity data repository 134 and accessed as necessary by the scenario presentation device 102. The example activity data repository 134 of FIG. 1 includes a processor 136, memory 138, and network interface 140. The processor 136 of the activity data repository 134 includes one or more processors. The processor 136 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 136 may be a programmable logic device, a microcontroller, a microprocessor, or any suitable combination of the preceding. The processor 136 is communicatively coupled to and in signal communication with the memory 138 and network interface 140. The one or more processors are configured to process data and may be implemented in hardware and/or software. For example, the processor 136 may be 8-bit, 16-bit, 32-bit, 64-bit or of any other suitable architecture. The processor 136 may include an arithmetic logic unit (ALU) for performing arithmetic and logic operations, processor registers that supply operands to the ALU and store the results of ALU operations, and a control unit that fetches instructions from memory 138 and executes them by directing the coordinated operations of the ALU, registers and other components. In an embodiment, the function of the activity data repository 134 described herein is implemented using logic units, FPGAs, ASICs, DSPs, or any other suitable hardware or electronic circuitry.

The memory 138 of the activity data repository 134 is operable to store any data, instructions, logic, rules, or code operable to execute the functions of the activity data repository 134. The memory 138 may store activity data 142 as well as any other logic, code, rules, and the like to execute functions of the activity data repository 134. As illustrated in FIG. 2 (described below), the activity data 142 may include properties of items involved with possible activities to be performed by users of the scenario presentation device 102, properties of environments in which the possible activities may take place, information about resources consumed to engage in the possible activities, and the like. The memory 138 includes one or more disks, tape drives, or solid-state drives, and may be used as an over-flow data storage device, to store programs when such programs are selected for execution, and to store instructions and data that are read during program execution. The memory 138 may be volatile or non-volatile and may comprise read-only memory (ROM), random-access memory (RAM), ternary content-addressable memory (TCAM), dynamic random-access memory (DRAM), and static random-access memory (SRAM).

The network interface 140 of the activity data repository 134 is configured to enable wired and/or wireless communications. The network interface 140 is configured to communicate data between the activity data repository 134 and other network devices, systems, or domain(s), such as the network 144 and scenario presentation device 102. The network interface 140 is an electronic circuit that is configured to enable communications between devices. For example, the network interface 140 may include one or more serial ports (e.g., USB ports or the like) and/or parallel ports (e.g., any type of multi-pin port) for facilitating this communication. As a further example, the network interface 140 may include a WIFI interface, a local area network (LAN) interface, a wide area network (WAN) interface, a modem, a switch, or a router. The processor 136 is configured to send and receive data using the network interface 140. The network interface 140 may be configured to use any suitable type of communication protocol as would be appreciated by one of ordinary skill in the art. The network interface 140 communicates activity data 142 to the scenario presentation device 102.

The communication network 144 may facilitate communication within the system 100. This disclosure contemplates the communication network 144 being any suitable network operable to facilitate communication between the first wearable device 102 and the server 106. Communication network 144 may include any interconnecting system capable of transmitting audio, video, signals, data, messages, or any combination of the preceding. Communication network 144 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In other embodiments, system 100 may not have all of the components listed and/or may have other elements instead of, or in addition to, those listed above.

Example Operation of the Scenario Presentation Device

FIG. 2 is a flow diagram 200 illustrating an example method of operating the scenario presentation device 102 shown in FIG. 1. FIG. 2 illustrates a number of steps 206, 210, 222, 224, 234, 242, 248, 260, 270 for generating and presenting a scenario representation 110 to a user 202. The user 202 may interact with the scenario presentation device 102 to initiate operation of the scenario presentation device 102. For example, at step 206, a user selection 208 of selectable activity types 204 may be received (e.g., via an input device 122). The selectable activity types 204 may be presented in the display 108 of the scenario presentation device 102. The selectable activity types 204 may correspond to a range of possible activities for which scenario representations 110 can be generated by the scenario presentation device 102. For example, the selectable activity types 204 may include different classes of activities, such as activities associated with traveling to a location, acquiring an object or item, changing a user behavior, or the like.

The selected activity type 204 is used at step 210 to present one or more selectable activity options 214 and/or an environment representation 212 to the user 202 on the display 108. The activity options 214 correspond to possible activities that the user 202 can perform. For example, activity options may correspond to activities the user 202 may consider performing within the class of activities identified by the selected activity type 204. For example, if an activity type 204 of acquiring an item is selected, then a number of possible items may be presented as the activity options 214. The environment representation 212 is a representation (e.g., as one or more images, a video, or the like) of an environment associated with the possible activities. For example, the environment representation 212 may include images captured by the camera 112 of the scenario presentation device 102. As another example, an environment representation may be previously stored or generated of an environment associated with the activity options 214 or corresponding to a user location (e.g., determined from GPS sensor 120). For instance, if activity options 214 correspond to actions 218 that can be performed in different locations, one or more of these locations may be presented as the environment representation 212. The action 218 may be associated with an item 216 at a time 220. For instance, the action 218 may acquire the item 216 at a liven time 220. The time 220 may be a time period over which the item 216 may be used.

At step 222, a selection 224 of one of the scenario options 214 is received. The selected scenario option 214 corresponds to a selected activity 226 for the user 202. The selected activity 226 is an action that might be performed by the user 202 at a future time and for which the user 202 wishes to view a representation of a possible outcome in the form of a scenario representation 110. As a few non-limiting examples, the selected activity 226 may be for the user 202 to acquire an item (e.g., an automobile as illustrated in the examples of FIGS. 3A-C and 4), to travel to a location, or the like. The selected activity 226 may correspond to an action 230 associated with an item 228 at a future time 232. For instance, the action 230 may be acquire the item 230 at a given time 232. The time 232 may be a time period over which the item 232 may be used. For example, an item 228, such as an automobile (see FIGS. 3A-C and 4) may be used for a number of years. As described further below, characteristics of the user 202 and the item 228 may change over time 232. The scenario presentation device 102 uniquely allows the user 202 to view an immersive representation of such changes via the scenario representation 110, such that previously unavailable information is presented to the user 202 in an easily interpreted format. This information may facilitate improved use of resources. In some cases, the scenario presentation device 102 may improve available the selection of whether or not to engage in the selected activity 226.

As illustrated in FIG. 2, the memory 106 may store the selected activity 226, and the processor 104 may use the selected activity along with one or both of the activity data 142 and user data 134 to determine the scenario representation 110 for the selected activity 226. In the example of FIG. 2, the processor 104 receives activity data 142 at step 234 and user data 134 at step 242. The activity data 142 and user data 134 may be received via the network interface 116, as described above with respect to FIG. 1. The activity data 142 may include item properties 236, environment properties 238, and/or resource properties 240 associated with the selected activity 226. For instance, the item properties 236 may include characteristics of the item 228 included in the selected activity 226. For example, item properties 236 may indicate how an appearance of an item 228 typically changes over time, how an item 228 may appear or perform in different environments, how an item 228 may be perceived by different users or users with different abilities (age, strength, visual acuity, etc.), and the like. The environment properties 238 may similarly include information about how an environment changes over time, is perceived by different users, and the like. The resource properties 240 may include an indication of resources consumed to engage in different activities. The consumed resources may be money, energy, time, or any other resource that may impact whether a user 202 engages in the selected activity 226.

The user data 134 may include user properties 244 and/or user resources 246. The user properties 244 may include properties of the user 202, such characteristics of their appearance, biometric features of the user 202, and the like. The user resources 246 may include information regarding resources available to the user to engage in various activities. For example, user resources 246 may indicate an amount of funds available to acquire item 228, projected user income, physical space available to the user 202 for storing item 228, energy available to the user 202 to engage in selected activity 226, and the like.

At step 248, the processor 104 uses the selected activity 226 and the activity data 142 and/or the user data 134 to determine activity properties 250. The activity properties 250 may include one or more of anticipated environment changes 252, anticipated item changes 254, anticipated resource consumption 256, and anticipated user changes 258. For example, the processor 104 may use the selected activity 226 and the environment properties 238 to determine anticipated environment changes 252 that correspond to expected changes to the environment representation 212 over time 232. In an example embodiment (see FIGS. 3A-C), the anticipated environment changes 252 may include expected changes in weather in the location of the user 202 over time 232. Other examples of anticipated environment changes 252 include changes to population and changes in user location.

Anticipated item changes 254 may be determined using the selected activity 226 and the item properties 236. The anticipated item changes 254 may correspond to changes to the appearance or other characteristics of item 228 over time 232. For instance, effects of wear on item 228 may be determined based on anticipated usage of item 228 by the user 202, the length of time 232 over which the selected activity 226 will proceed, the environment properties 238 of the location in which item is located for the selected activity 226, and the like. Anticipated resource consumption 256 may be determined using the selected activity 226 and the resource properties 240. The anticipated resource consumption 256 corresponds to the expected consumption of resources over time 232. An example presentation of anticipated resource consumption 256 is illustrated in FIGS. 3A-C and 4, as described below.

Anticipated user changes 258 may be determined using the selected activity 226 and the user properties 244. The anticipated user changes 258 generally correspond to expected changes to the user 202 over the time 232 of the selected activity 226. In an example embodiment (see FIGS. 3A-C and 4), the anticipated user changes 258 may correspond to a change to the number of people in the user's family. In another example embodiment (see FIGS. 5A-C and 6A-C), the anticipated user changes 258 include an anticipated change in the visual acuity of the user 202 over time 232. In this embodiment, the scenario representation 110 includes a representation of the projected environment 262 with images depicting a perceived appearance of the environment that is based at least in part on anticipated changes in the user's visual acuity that are included in the anticipated user changes 258.

Figure 3A:
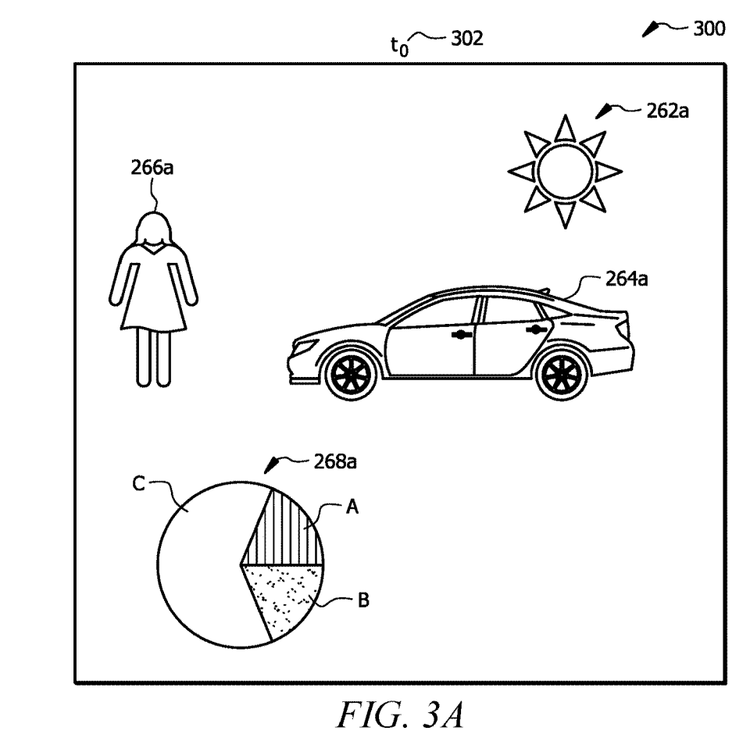
FIGS. 3A-C illustrate example scenario representations at different time points during a time period of a selected activity.
Figure 3B:
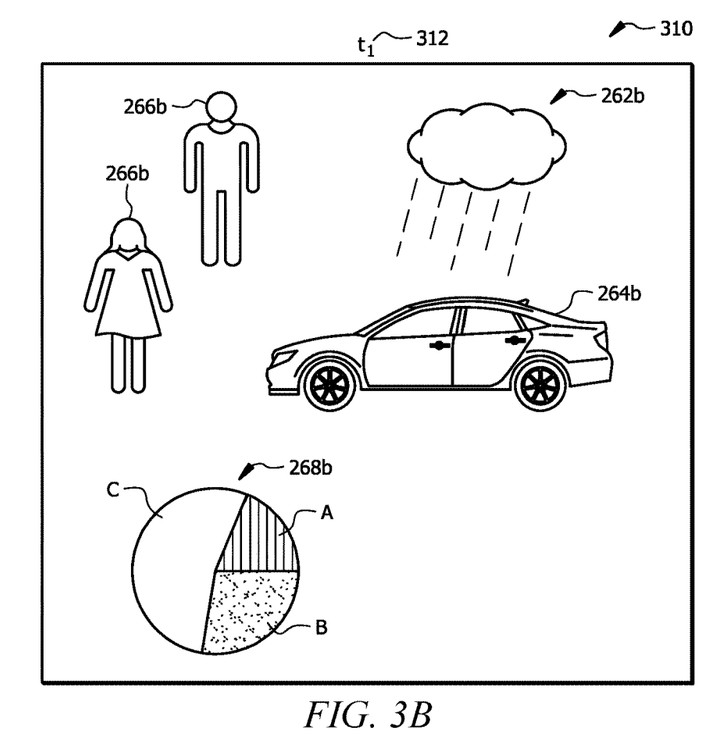
Figure 3C:
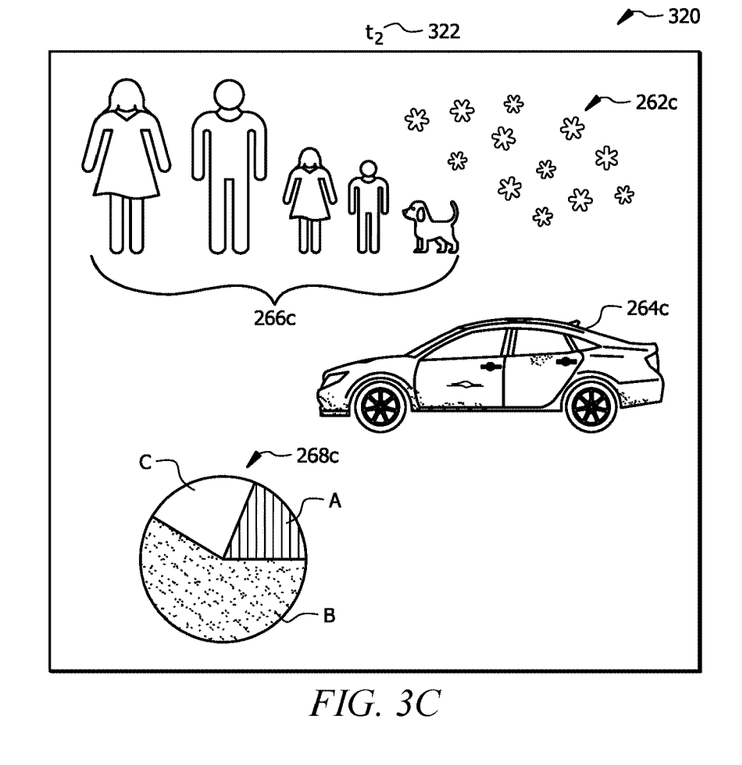

At step 260, the processor 104 uses the activity properties 250 to determine the scenario representation 110 for the selected activity 226. The scenario representation 110 may include representations (e.g., visual or audio-visual representations) of the projected environment 262 (e.g., the environment representation 212 as it may appear over time 232 if the selected activity 226 is performed), the projected item 264 (e.g., a representation of the item 228 as it may appear over time 232 if the selected activity 226 is performed), the projected user 266 (a representation of the user 202 as they may appear over time 232 if the selected activity 226 is performed), and/or the projected resources 268 (e.g., a projected change in, or consumption of, user resources 246 if the selected activity 226 is performed). For example, the representation of the projected environment 262 may be determined using the anticipated changes to the environment 252 over time 232. The representation of the projected environment 262 may include one or more images depicting changes to the environment (e.g., changes to environment representation 212) over time 232. In an example where the selected activity 226 corresponds to acquiring item 228, the representation of the projected environment 262 may further depict the acquired item 228 within the environment at different points in a time interval defined by time 232. As another example, the anticipated item changes 254 over time 232 may be used to determine the representation of the projected item 264 that includes images depicting changes to the item 228 over time 232. As another example, the anticipated user changes 258 over time 232 may be used to determine the representation of the projected user 266 that includes images depicting changes to the user 202 over time 232. As yet another example, the anticipated resource consumption 256 over time 232 may be used to determine the representation of the projected resources 268 that illustrates (e.g., as a value entry, chart, or the like) the anticipated resource consumption at a given time during time 232. Examples of representations of a projected environment 262, projected item 264, projected user 266, and projected resources 268 are shown in FIGS. 3A-C.

At step 270, the processor 104 provides the scenario representation 110 for presentation in the display 108. The scenario representation 110 may be presented as an image or a video. In some cases, the scenario representation 110 may be overlaid over the environment representation 212 such that one or more of the projected environment 262, projected item 264, projected user 266, and projected resources 268 are shown overlaid or integrated within the local environment of the user 202. In some cases, the scenario representation 110 may be an immersive representation (e.g., a virtual reality representation). For instance, the scenario representation 110 may show, at each of a plurality of time points during time 232 of the selected activity 226, an image of the item 228 as projected to appear according to projected item 228, an image of the user 202 as projected to appear according to projected user 266, and/or an image of the environment as projected to appear according to the projected environment 262.

Example Scenario Representations

Visual Representations of Projected Outcomes of Activities Over Time

FIGS. 3A-C illustrate images 300, 310, 320 of an example scenario representation 110 that shows projected outcomes for a selected activity 226 of acquiring an item 228 that is an automobile. Images 300, 310, 320 correspond to different time points 302, 312, 322 within a time 232 associated with the selected activity 226. For example, time 232 may correspond to an expected time within which the user 202 will continue to use the item 228. Example image 300 includes presentations of a projected environment 262a, projected item 264a, projected user 266a, and projected resources 268a at an initial time 302 following acquiring the item 228.

At the initial time 302, the projected environment 262a corresponds to an expected sunny location. For example, the scenario presentation device 102 may determine that at time 302, the user 202 is expected to live in a location with mild weather. For example, this location determination may be made using user properties 244 indicating current and future locations of the user 202, environment properties 238 indicating projected weather trends in various locations, and/or user location information (e.g., from GPS sensor 120). At subsequent time 312 (FIG. 3B), the projected environment 262b may indicate that the user 202 is expected to be in a location with increased rainfall. For example, user data 134 may indicate that the user 202 is likely to move to a new location by time 312, or the environment properties 238 may indicate that weather will change in the user's location. At final time 322 (FIG. 3C), the projected environment 262b may indicate that the user 202 is expected to be in a location with increased snowfall. Information about the projected environment 262a-c over time may provide previously unavailable insights to the user 202 for deciding whether to engage in the selected activity 226. For instance, information about expected weather may impact whether the user 202 decides to acquire the automobile item 228.

At the initial time 302, the projected item 264a corresponds to an expected appearance of the item 228. For example, the scenario presentation device 102 may determine that at time 302, the item 228 is relatively new and unchanged from its initial appearance. For example, the projected item 264a at time 302 may correspond to an initial item appearance included in the item properties 236. At subsequent times 312 and 322 (FIGS. 3B and 3C), the projected item 264b and 264c may become progressively worn and/or damaged with use. In some cases, changes in the representation of projected item 264b,c at times 312, 322 may be based at least in part on changes in the environment, as indicated by projected environment 262b,c. For instance, additional wear on item 228 may be anticipated in certain environments as illustrated for the environment with increased snowfall shown in FIG. 3C. Information about the projected item 264a-c over time 232 may provide previously unavailable insights to the user 202 for deciding whether to engage in the selected activity 226. For instance, information about expected changes in the quality of the item 228 over time 232 may inform the user 202 whether or not to acquire the automobile item 228.

The representations of projected user 266a-c at times 302, 312, 322 provide a visual representation of how the family of the user 202 is projected to change over the time 232 associated with the selected activity 226. In this example, the user 202 is represented by a projected user 266a at time 302 that is a single person (e.g., user 202), a projected user 266b at time 312 that is a pair of people (e.g., user 202 and a partner), and projected user 266c that is a larger family at time 322. Information about the projected user 266a-c over time may provide previously unavailable insights to the user 202 for deciding whether to engage in the selected activity 226. For instance, the user 202 can determine whether the item 228 will be suitable for the user's needs at the different time points 302, 312, 322 before making engaging in the selected activity 226. For example, the automobile item 228 shown as representation of projected item 246c may be too small to hold the family shown as the representation of the projected user 266a-c.

The representations of projected resources 268a-c at times 302, 312, 322 provide a visual representation of resources available to the user 202 at each time 302, 312, 322. In the examples of FIGS. 3A-C, the projected resources 268a-c are displayed as pie graphs of total resources as they are allocated to support various needs of the user 202. Portion "A" of the projected resources 268a-c corresponds to the portion of the user's total resources needed to use the item 228 at that time 302, 312, 322. Portion "B" of the projected resources 268a-c corresponds to the portion of the user's total resources needed to fulfill other needs of the user 202 at times 302, 312, 322. Portion "C" of the projected resources 268a-c corresponds to the remaining portion of the user's total resources that are free or otherwise available at times 302, 312, 322. As shown in the example of FIGS. 3A-C, Portion "A" remains relatively constant, while Portion "B" increases over time (e.g., because of other needs of the user 202). As such, the projected resources 268a-c shows that the relative amount of resources needed to engage in the selected activity (Portion "A") to the amount of unused resources (Portion "C") increases over time. As such, the selected activity 226 may consume more resources than may be acceptable to the user 202 at times 302, 312, 322.

Figure 4:
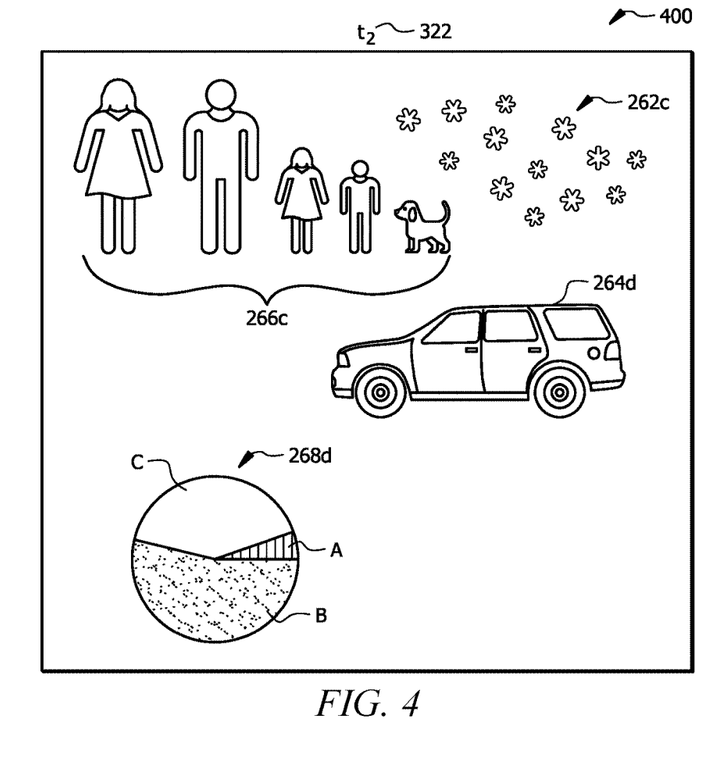
FIG. 4 illustrates an example alternative scenario representation at the time point of FIG. 3C if the user had selected a different activity.

In some cases an alternative scenario representation 110 may be presented such as is illustrated in FIG. 4. FIG. 4 shows an image 400 of a representation of an outcome of a different selected activity 226 that corresponds to acquiring a different automobile item 228 that is larger and lower cost than that shown in FIGS. 3A-C. FIG. 4 shows the projected outcome of this activity 226 at time 322 (for comparison to the projected outcome shown in FIG. 3C). As shown in image 400, the representations of the projected environment 262c and projected user 266c are unchanged from FIG. 3C, but the representations of the projected item 624d and the projected resources 268d are changed to reflect the different selected activity 226 of acquiring the different item 228. In this example, the projected item 264d reflects the projected appearance of the different item 228 at time 264d. In this example, the different item 228 is a larger automobile that has a capacity to hold the larger family indicated by the representation of the projected user 266c at time 322. The representation of the projected resources 268d also shows that portion of resources used for the selected activity (Portion "A") is decreased relative to that shown for projected resources 268c of FIG. 3C.

Immersive Scenario Representations

Figure 5A:
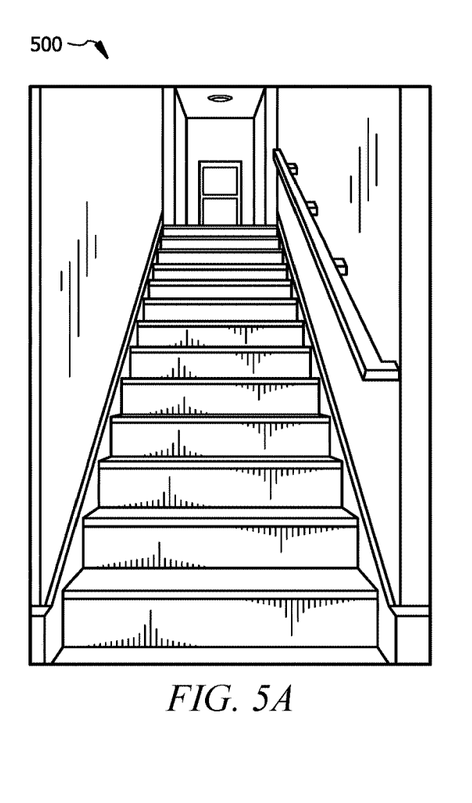
FIGS. 5A-C illustrate an example immersive scenario representation.
Figure 5B:
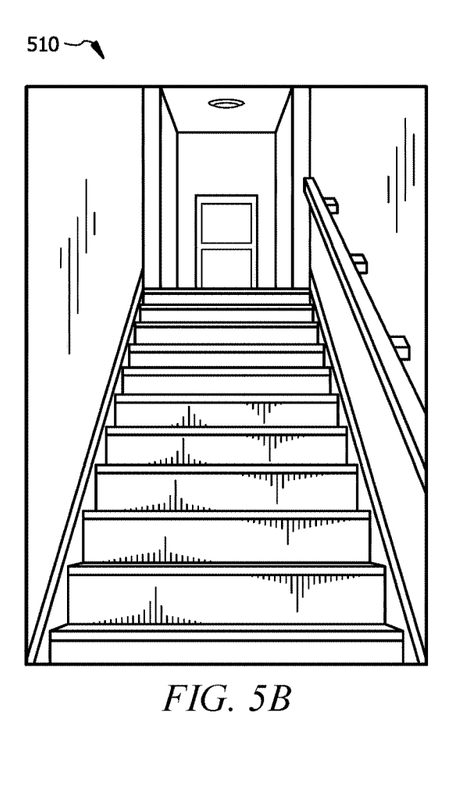
Figure 5C:
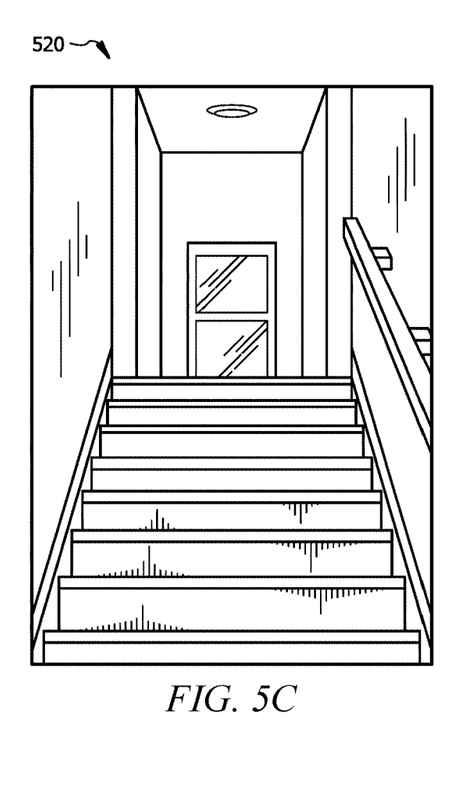

As described above, in some embodiments, scenario representations 110 may provide an immersive experience to the user 202 with improved accuracy for presenting potential outcomes of performing a selected activity 226. FIGS. 5A-C and FIGS. 6A-C illustrate two different example immersive scenario representations 110 (images 500, 510, 520 of FIGS. 5A-C and images 600, 610, 620 of FIGS. 6A-C). The images 500, 510, 520 of FIGS. 5A-C are a portion of an immersive representation of the user 202 walking up a flight of stairs. Such images 500, 510, 520 may be generated as part of a scenario representation 110 for a selected activity 226 of traveling to a location with a flight of stairs, acquiring a home with a flight of stairs, or the like. The images 500, 510, 520 of FIGS. 5A-C depict the user's experience walking up the flight of stairs with reliable movement control and high visual acuity. However, over time, these abilities of the user 202 may decline, such that movement is more difficult and visual acuity is decreased. For example, as the user 202 changes with time, their visual acuity and/or ability to move may decrease, such that walking up a flight of stairs may become more difficult.

Figure 6A:
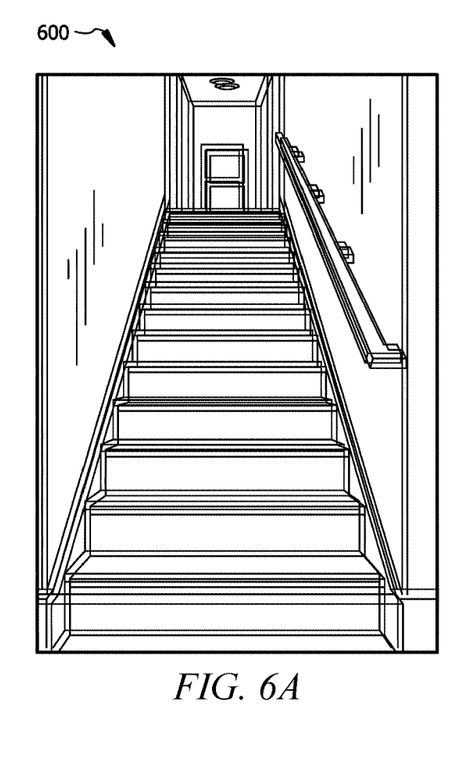
FIGS. 6A-C illustrate an example alternative immersive scenario representation of FIGS. 5A-C with changed user properties.
Figure 6B:
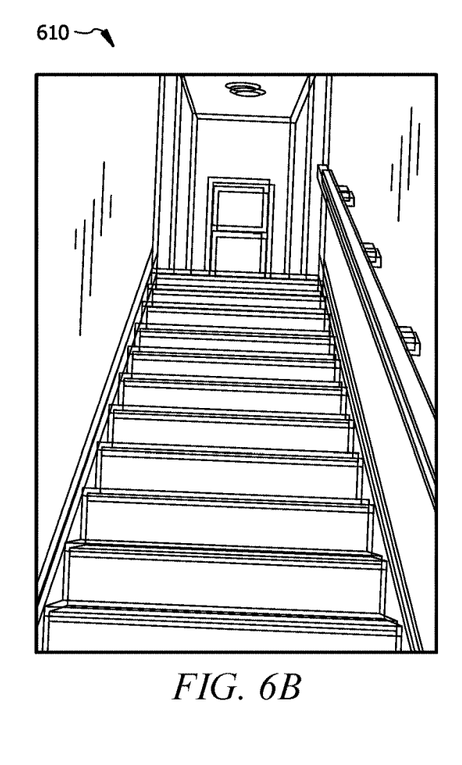
Figure 6C:
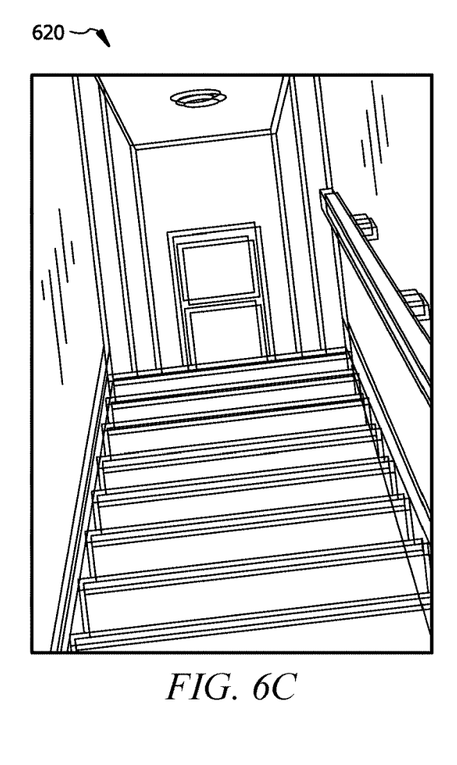

Images 600, 610, 620 of FIGS. 6A-C provide an immersive presentation of how walking up the same flight of stairs may appear as the user 202 changes with time or after the visual acuity and movement ability of the user 202 decreases (e.g., after an accident, injury, or the like). The changes to the user's visual acuity and/or movement ability may be indicated by the user properties 244 described with respect to FIG. 2 above. Images 600, 610, 620 represent immersive views of the user 202 moving up the flight of stairs at subsequent points in time. Images 600, 610, 620 appear less visually clear to reflect the changes perception of the user 202 with a decrease in visual acuity.

The scenario presentation device 102 of this disclosure allows the user 202 to view an immersive scenario representation 110 that captures such changes in the user's abilities. This improved immersive experience allows the user 202 to more reliable allocation of resources to prospective activities. These immersive scenario representations 110 also provide readily interpretable and more accurate visual representations of possible outcomes of the selected activity 226 than is possible through the user's mind alone or using previous technology. Thus, at least certain embodiments of the scenario presentation device 102 provide the practical application of presenting improved and more realistic information to user 202.

While several embodiments have been provided in this disclosure, it should be understood that the disclosed system and method might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
an activity data repository comprising a memory operable to store activity data, the activity data comprising item properties associated with items involved with possible activities, environment properties associated with environments in which the possible activities take place, and resource properties corresponding to resources consumed to engage in the possible activities, wherein the environment properties indicate projected weather trends in a plurality of locations and user location information; and
a scenario presentation device comprising:
a network interface communicatively coupled to the activity data repository;
an electronic display; and
a processor operatively coupled to the network interface and the electronic display, the processor configured to:
present, in the electronic display, one or more selectable options corresponding to possible activities and a representation of an environment associated with the possible activities;
receive a selection of a first scenario option of the one or more selectable options, the selected first scenario option corresponding to a selected activity, wherein the selected activity corresponds to an action involving an item to be performed over a period of time in the environment;
determine, based at least in part upon the selected activity and the environment properties of the activity data, a plurality of anticipated changes to the environment over the period of time, wherein the plurality of anticipated changes to the environment comprise a first anticipated change that indicates a weather change at a first location of the plurality of locations from a first weather to a second weather;
in conjunction with identifying that the user location information comprises the first location, determine, based at least in part upon the anticipated changes to the environment over the period of time, a projected environment representation for the selected activity at the first location, wherein the projected environment representation comprises one or more images depicting changes to the environment over the period of time associated with the selected activity, and the projected environment representation comprises the weather change at the first location from the first weather to the second weather over the period of time;
determine, based at least in part upon the selected activity and the resource properties of the activity data, a plurality of anticipated changes to resources over the period of time, wherein the plurality of anticipated changes to the resources comprise a second anticipated change that indicates an expected consumption of the resources over the period of time;
in conjunction with identifying that the user location information comprises the first location, determine, based at least in part upon the anticipated changes to the resources over the period of time, a projected resources representation for the resources that comprises one or more images illustrating anticipated resource consumption over the period of time associated with the selected activity, wherein:
the one or more images comprise a first plurality of projected resources at a first time instance, a second plurality of projected resources at a second time instance, and a third plurality of projected resources at a third time instance; and
the period of time comprises the first time instance, the second time instance, and the third time instance; and
present, as an overlay in the electronic display, the projected environment representation and the projected resources representation determined for the selected activity.

2. The system of claim 1, wherein:
the selected activity corresponds to acquiring the item; and
the processor is further configured to determine, using the anticipated changes to the environment, the projected environment representation for the selected activity comprising images depicting the acquired item within the environment at different points in time during the period of time.

3. The system of claim 1, wherein the processor is further configured to:
determine, using the selected activity and the item properties of the activity data, anticipated changes to the item over the period of time;
determine, using the anticipated changes to the item over the period of time, a projected item representation for the selected activity, the projected item representation comprising one or more images depicting changes to the item over the period of time associated with the selected activity; and
present, in the electronic display, the projected item representation determined for the selected activity within the projected environment.

4. The system of claim 3, wherein the processor is further configured to, in the electronic display, present, at each of a plurality of time points during the period of time, an image of the item as projected, according to the projected item representation, to appear at the time point and an image of the environment as projected, according to the projected environment representation, to appear at the time point.

5. The system of claim 1, wherein:
the system further comprises a user data repository comprising a memory operable to store user data, the user data comprising properties of a user and information regarding resources available to the user to engage in the possible activities;
the network interface of the scenario presentation device is further communicatively coupled to the user data repository; and
the processor of the scenario presentation device is further configured to:
determine, using the selected activity and the properties of the user, anticipated changes to the user over the period of time;
determine, using the anticipated changes to the user over the period of time, a projected user representation for the selected activity, the projected user representation comprising one or more images depicting changes to the user over the period of time associated with the selected activity; and present, in the electronic display, the projected user representation determined for the selected activity within the projected environment.

6. The system of claim 5, wherein:
the selected activity corresponds to the user moving about in the environment;
the anticipated changes to the user comprise anticipated changes in visual acuity of the user; and
the processor is further configured to determine the projected environment representation for the selected activity comprising images depicting a perceived appearance of the environment based at least in part on the anticipated changes in the visual acuity of the user.

7. The system of claim 5, wherein the processor is further configured to:
determine, using the resource properties included in the activity data and the resources available to the user included in the user data, an anticipated consumption of resources over the period of time; and
present, in the electronic display, the anticipated consumption of resources for the selected activity.

8. A method, comprising:
storing activity data, the activity data comprising item properties associated with items involved with possible activities, environment properties associated with environments in which the possible activities take place, and resource properties corresponding to resources consumed to engage in the possible activities, wherein the environment properties indicate projected weather trends in a plurality of locations and user location information;
presenting, in an electronic display, one or more selectable options corresponding to possible activities and a representation of an environment associated with the possible activities;
receiving a selection of a first scenario option of the one or more selectable options, the selected first scenario option corresponding to a selected activity, wherein the selected activity corresponds to an action involving an item to be performed over a period of time in the environment;
determining, based at least in part upon the selected activity and the environment properties of the activity data, a plurality of anticipated changes to the environment over the period of time, wherein the plurality of anticipated changes to the environment comprise include a first anticipated change that indicates a weather change at a first location of the plurality of locations from a first weather to a second weather;
in to conjunction with identifying that the user location information comprises the first location, determining, based at least in part upon the anticipated changes to the environment over the period of time, a projected environment representation for the selected activity at the first location, wherein the projected environment representation comprises one or more images depicting changes to the environment over the period of time associated with the selected activity, and the projected environment representation comprises the weather change at the first location from the first weather to the second weather over the period of time;
determining, based at least in part upon the selected activity and the resource properties of the activity data, a plurality of anticipated changes to resources over the period of time, wherein the plurality of anticipated changes to the resources comprise a second anticipated change that indicates an expected consumption of the resources over the period of time;
in conjunction with identifying that the user location information comprises the first location, determining, based at least in part upon the anticipated changes to the resources over the period of time, a projected resources representation for the resources that comprises one or more images illustrating anticipated resource consumption over the period of time associated with the selected activity, wherein:
the one or more images comprise a first plurality of projected resources at a first time instance, a second plurality of projected resources at a second time instance, and a third plurality of projected resources at a third time instance; and
the period of time comprises the first time instance, the second time instance, and the third time instance; and
presenting, as an overlay in the electronic display, the projected environment representation determined for the selected activity.

9. The method of claim 8, wherein:
the selected activity corresponds to acquiring the item; and
the method further comprises determining, using the anticipated changes to the environment, the projected environment representation for the selected activity comprising images depicting the acquired item within the environment at different points in time during the period of time.

10. The method of claim 8, further comprising:
determining, using the selected activity and the item properties of the activity data, anticipated changes to the item over the period of time;
determining, using the anticipated changes to the item over the period of time, a projected item representation for the selected activity, the projected item representation comprising one or more images depicting changes to the item over the period of time associated with the selected activity; and
presenting, in the electronic display, the projected item representation determined for the selected activity within the projected environment.

11. The method of claim 10, further comprising, in the electronic display, presenting, at each of a plurality of time points during the period of time, an image of the item as projected, according to the projected item representation, to appear at the time point and an image of the environment as projected, according to the projected environment representation, to appear at the time point.

12. The method of claim 8, further comprising:
storing user data comprising properties of a user and information regarding resources available to the user to engage in the possible activities;
determining, using the selected activity and the properties of the user, anticipated changes to the user over the period of time;
determining, using the anticipated changes to the user over the period of time, a projected user representation for the selected activity, the projected user representation comprising one or more images depicting changes to the user over the period of time associated with the selected activity; and
presenting, in the electronic display, the projected user representation determined for the selected activity within the projected environment.

13. The method of claim 12, wherein:
the selected activity corresponds to the user moving about in the environment;
the anticipated changes to the user comprise anticipated changes in visual acuity of the user; and
the method further comprises determining the projected environment representation for the selected activity comprising images depicting a perceived appearance of the environment based at least in part on the anticipated changes in the visual acuity of the user.

14. The method of claim 12, further comprising:
determining, using the resource properties included in the activity data and the resources available to the user included in the user data, an anticipated consumption of resources over the period of time; and
presenting, in the electronic display, the anticipated consumption of resources for the selected activity.

15. A scenario presentation device, comprising:
a network interface communicatively coupled to an activity data repository storing activity data, the activity data comprising item properties associated with items involved with possible activities, environment properties associated with environments in which the possible activities take place, and resource properties corresponding to resources consumed to engage in the possible activities, wherein the environment properties indicate projected weather trends in a plurality of locations and user location information;
an electronic display; and
a processor operatively coupled to the network interface and the electronic display, the processor configured to:
  present, in the electronic display, one or more selectable options corresponding to possible activities and a representation of an environment associated with the possible activities;
  receive a selection of a first scenario option of the one or more selectable options, the selected first scenario option corresponding to a selected activity, wherein the selected activity corresponds to an action involving an item to be performed over a period of time in the environment;
  determine, based at least in part upon the selected activity and the environment properties of the activity data, a plurality of anticipated changes to the environment over the period of time, wherein the plurality of anticipated changes to the environment comprise a first anticipated change that indicates a weather change at a first location of the plurality of locations from a first weather to a second weather;
  in conjunction with identifying that the user location information comprises the first location, determine, based at least in part upon the anticipated changes to the environment over the period of time, a projected environment representation for the selected activity at the first location, wherein the projected environment representation comprises one or more images depicting changes to the environment over the period of time associated with the selected activity, and the projected environment representation comprises the weather change at the first location from the first weather to the second weather over the period of time;
  determining, based at least in part upon the selected activity and the resource properties of the activity data, a plurality of anticipated changes to resources over the period of time, wherein the plurality of anticipated changes to the resources comprise a second anticipated change that indicates an expected consumption of the resources over the period of time;
  in conjunction with identifying that the user location information comprises the first location, determining, based at least in part upon the anticipated changes to the resources over the period of time, a projected resources representation for the resources that comprises one or more images illustrating anticipated resource consumption over the period of time associated with the selected activity, wherein:
    the one or more images comprise a first plurality of projected resources at a first time instance, a second plurality of projected resources at a second time instance, and a third plurality of projected resources at a third time instance; and
    the period of time comprises the first time instance, the second time instance, and the third time instance; and
  present, as an overlay in the electronic display, the projected environment representation determined for the selected activity.

16. The scenario presentation device of claim 15, wherein:
the selected activity corresponds to acquiring the item; and
the processor is further configured to determine, using the anticipated changes to the environment, the projected environment representation for the selected activity comprising images depicting the acquired item within the environment at different points in time during the period of time.

17. The scenario presentation device of claim 15, wherein the processor is further configured to:
determine, using the selected activity and the item properties of the activity data, anticipated changes to the item over the period of time;
determine, using the anticipated changes to the item over the period of time, a projected item representation for the selected activity, the projected item representation comprising one or more images depicting changes to the item over the period of time associated with the selected activity; and
present, in the electronic display, the projected item representation determined for the selected activity within the projected environment.

18. The scenario presentation device of claim 15, wherein:
the network interface of the scenario presentation device is further communicatively coupled to a user data repository storing user data, the user data comprising properties of a user and information regarding resources available to the user to engage in the possible activities; and
the processor of the scenario presentation device is further configured to:
  determine, using the selected activity and the properties of the user, anticipated changes to the user over the period of time;
  determine, using the anticipated changes to the user over the period of time, a projected user representation for the selected activity, the projected user representation comprising one or more images depicting changes to the user over the period of time associated with the selected activity; and present, in the electronic display, the projected user representation determined for the selected activity within the projected environment.

19. The scenario presentation device of claim 18, wherein:
- the selected activity corresponds to the user moving about in the environment;
- the anticipated changes to the user comprise anticipated changes in visual acuity of the user; and
- the processor is further configured to determine the projected environment representation for the selected activity comprising images depicting a perceived appearance of the environment based at least in part on the anticipated changes in the visual acuity of the user.

20. The scenario presentation device of claim 18, wherein the processor is further configured to:
- determine, using the resource properties included in the activity data and the resources available to the user included in the user data, an anticipated consumption of resources over the period of time; and
- present, in the electronic display, the anticipated consumption of resources for the selected activity.

* * * * *